Figure 1:
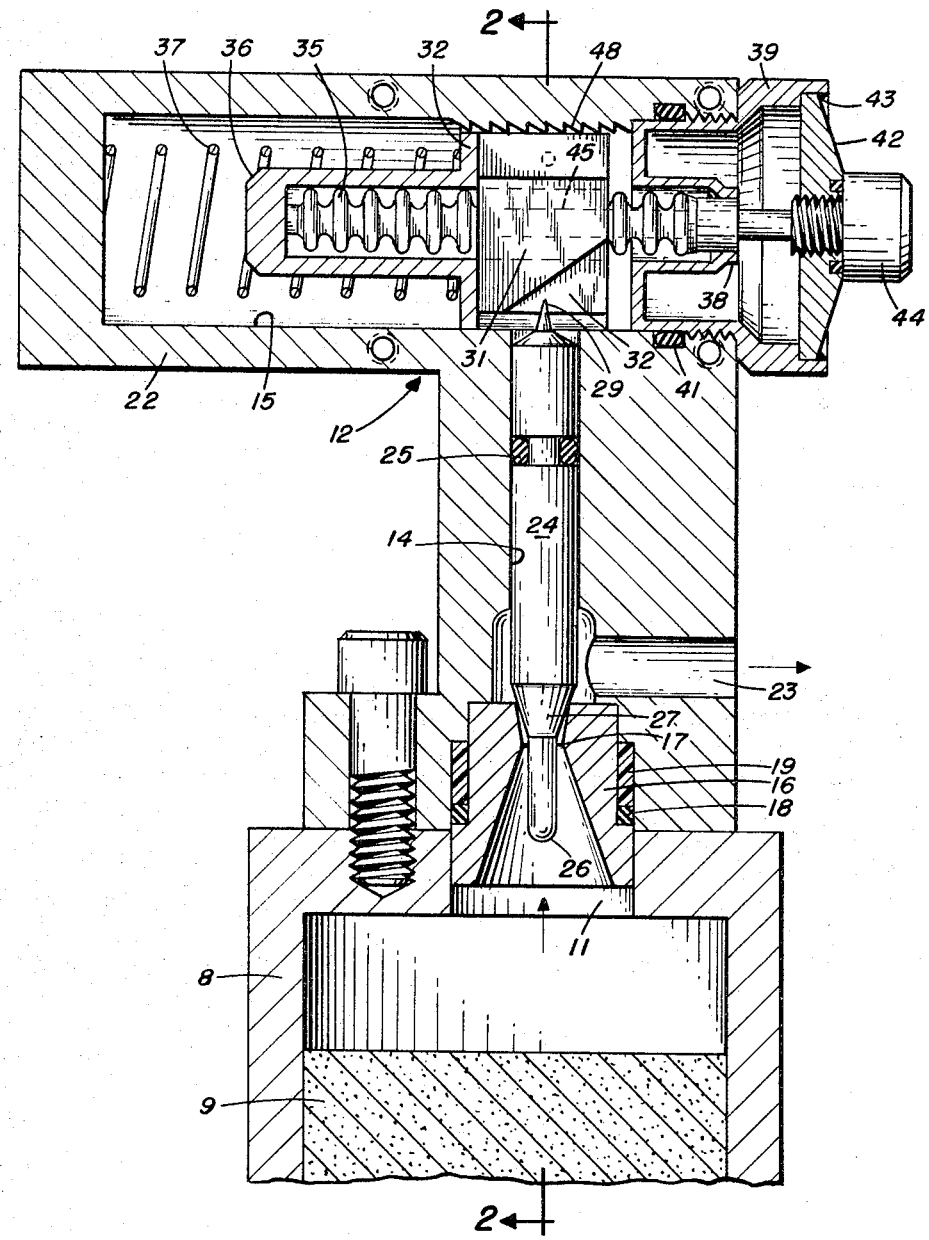

July 25, 1967  L. LO FIEGO  3,332,237
MECHANICAL VALVE
Filed Oct. 27, 1964  2 Sheets-Sheet 1

INVENTOR
LOUIS LO FIEGO

BY Claude Funkhouser
ATTORNEY

United States Patent Office 3,332,237
Patented July 25, 1967

3,332,237
MECHANICAL VALVE
Louis Lo Fiego, Newhall, Calif., assignor, by mesne assignments, to the United States of America as represented by the Secretary of the Navy
Filed Oct. 27, 1964, Ser. No. 406,948
3 Claims. (Cl. 60—39.47)

This invention relates to valve construction and, more particularly, to that type of valve controlling the discharge of gases from a generator and which may be preset before the discharge of such gases by the pressure generated by the gases and varied in its setting by a temperature controlled apparatus and finally locked in the position determined upon by a temperature controlling means.

The need for a valve of this type arises from the conditions existing during the firing of gas generators fueled by solid grain propellants. It is desirable that the rate of burning be such that there is a constant mass-flow of gas. The burning rate of a solid grain propellant is effected by the temperature of the grain at the start of the burning. This may be termed environmental temperature and varies in this use from 170° to −40° F., generally, dependent upon where the rocket may be stored previous to firing.

Efforts were made during the development of this invention to produce a constant mass-flow rate gas generator by adjusting the ballistic behavior of the grain through chemical composition of the propellants. This was not considered feasible.

As a constant mass-flow rate was desirable and the burning rate varied with the temperature, a means of controlling the size of the orifice for the exhaust gases and once this size was determined upon to fix the opening so that it could not be again varied was the problem. The rate of burning of the grain was almost constant once the burning had started. An orifice sufficiently large with a throat area which could be controlled within limits which would encompass both high temperatures and low temperatures and allow for deposits during the flow of exhaust gases was needed. This discharge opening had to be set just previous to the time of firing in accordance with the environmental temperature of the grain and once set maintained regardless of the temperature of the exhaust gases. A once set valve, which was subject to temperature control until set and when set was uneffected by temperature, would answer the problem.

It is the object of this invention to provide a valve for a solid fuel gas generator which may beset by the ignition of the solid fuel and to provide temperature controlled means controlling the position at which the valve is set.

It is another object of the present invention to provide a gas generator having a discharge orifice formed with a restricted throat area and to provide a needle valve which could move to a selected position in that throat area to control the size of the orifice opening.

It is still another object of the present invention to provide a needle valve which would be movable relative to a restricted throat area in a discharge orifice and to vary this movement to control the size of the orifice.

It is a further object of the present invention to provide means contacting the needle valve and limiting the movement of this valve and to regulate this contacting means by a temperature sensitive element.

It is a still further object of the present invention to provide a temperature sensitive device which will actuate an angled plate to move the plate into the path of the needle valve to limit the movement of the needle valve.

It is a still further object of the present invention to provide an angled plate controlled by a temperature sensitive device which will limit the movement of the needle valve and will further engage and hold the needle valve in a desired position.

Figure 2:
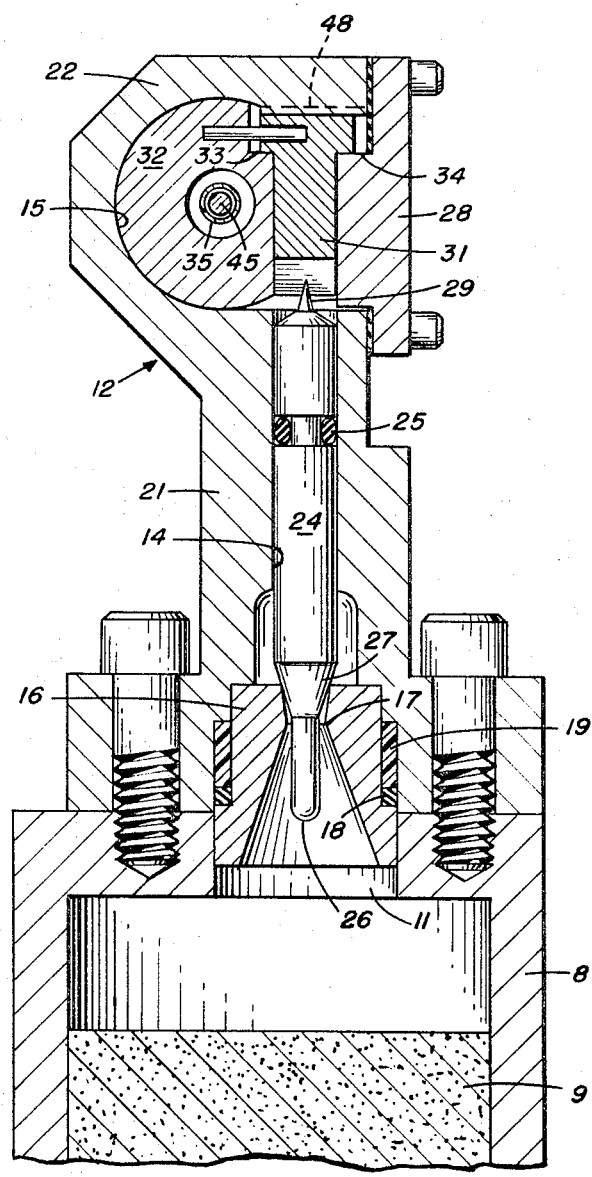

Other objects, advantages and novel features of the invention will become apparent from the following detailed description of the invention when considered in conjunction with the accompanying drawings wherein:

FIG. 1 is a vertical cross-sectional view of the valve as applied to the gas generator;
FIG. 2 is a similar view taken at right angles to FIG. 1.

Referring to the drawings wherein like parts are given like numbers, a gas generator 8 houses a solid propellant grain 9 and is formed with an opening 11. Attached by screws 13 to the gas generator 8 is an angled housing 12 which is formed with longitudinal bores 14 and 15 in each of the angled sections, respectively.

Fitted within the opening 11 of the gas generator is a valve seat 16. The valve seat 16 is bored in a conical bore from each end to form a restricted throat area 17 where the conical bores meet. The valve seat is sealed within the opening 11 by an O-ring 18 and packing 19 to insure discharge of all of the exhaust gases through the restricted throat area 17.

The housing 12, as shown in the drawing, has a vertical section 21 and a horizontal section 22. The vertical section has a longitudinal bore 14 which is enlarged at the end nearest the gas generator and formed with a lateral passage 23 communicating with this enlarged portion of the bore. The lateral passage provides an exhaust port for the exhaust gases from the generator. Carried for sliding movement in the bore 14 is a needle valve 24 formed with an annular groove on which an O-ring 25 is carried to seal the needle within the bore and to prevent the escape of exhaust gases around the needle valve.

The needle valve is formed with a reduced end portion 26 and a conical section 27. The needle portion 26 enters the valve seat, passes through the restricted throat area and extends downward until stopped by engagement of the conical section of the needle valve with the valve seat. This engagement of the conical portion of the needle valve with the valve seat provides a substantial stoppage of the opening from the gas generator so that upon ignition of the propellant fuel there will be a pressure build-up within the gas generator until such pressure is sufficient to move the needle valve against the drag exerted by the O-ring. The end of the needle valve furtherest from the valve seat is formed with an integral spike 29. This spike is on the center line of the needle valve and moves with the needle valve on the center line of the bore 14.

The horizontal section 22 of the housing has a bore 15 which is substantially tangent to the center line of the bore 14. A portion of the bore 15 is exposed and normally covered with a plate 28. This formation of the bore provides an enlarged portion, opposite the cover plate and houses an angled limiting plate 31. The angled limiting plate 31 is carried by a piston like support 32 which is flattened at one portion of its circumference and formed with a cut away portion 33 to adequately support the angled limiting plate. The plate 31 is substantially T-shape in cross section, the cross bar of the T riding on the cut away portion of the piston and on a shoulder 34 of the cover 28. The plate 31 is therefore accurately positioned with regard to the center line of the bore 14 where it will be engaged by the spike 29 of the needle valve upon longitudinal movement of the needle valve. The limiting plate is angled on the surface presented to the spike 29 and is positioned by a temperature sensitive element so that the travel of the needle valve is limited by the position of the limiting plate.

The bore 15 also houses a temperature sensitive element 35 mounted in a slender cylindrical casing 36 which forms part of the piston like support 32. The temperature sensitive element 35 is partially housed in the cylindrical element and partly housed within the piston like support 32. A coil spring 37 is housed within the bore 15 and engages the cylindrical casing 36 to bias the temperature sensitive element and the piston like support 32 to a zero position from which it is moved by the action of the temperature sensitive element.

The free end of the temperature element extends into and is sealed to a cylindrical housing 38 on the inward end of a cap 39. The cap 39 is threaded into the bore 15 and has a sealing washer 41 to insure a snug fit. The cap 39 is hollow and serves as a reservoir for a temperature sensitive liquid which fills the temperature sensitive element 35. A cover 42 for the cap 41 gives access to the reservoir and is held in place by a retaining ring 43. The cover 42 has a central threaded opening receiving a screw cap 44 seating against a washer and provided with a rod 45 which extends centrally of the temperature sensitive element 32 for approximately half of its length.

In use, the needle valve is in the position shown in FIG. 1 substantially closing the valve seat and in the lowermost (referring to the drawing) position of the valve. The limiting plate is in a position which is determined by the environmental temperature to which the apparatus is exposed which may be from −40° to 170° F. The angled portion of the limiting plate is in line with the center line of the bore 14 and in position to be engaged by the spike 29. Upon the ignition of the solid propellant grain there is a slight pressure build-up within the gas generator 8 which will drive the needle valve upward (referring to the drawing) engaging the spike with the angled portion of the limiting plate. The plate is itself driven upward by the engagement with the needle valve, into a plurality of teeth 48 which will receive the soft metal of the limiting plate and prevent further movement of the plate through any movement of the temperature sensitive element. With the spike firmly embedded in the soft metal of the plate and the plate impaled on the teeth 49, the valve is held in a relative immovable position with regard to the valve seat so that there can be a constant mass-flow of gases through the seat from the gas generator during the burning of the grain. As the grain burns at a substantially constant rate, the problem of obtaining a constant mass-flow regardless of environmental temperature is solved by the inclusion of a variable opening from the gas generator.

Obviously many modifications and variations of the present invention are possible in the light of the above teachings. It is therefore to be understood that within the scope of the appended claims the invention may be practiced otherwise than as specifically described.

What is claimed is:
1. In a solid fuel servo system, a gas generator comprising:
   a combustion chamber formed with a discharge orifice;
   a solid propellant grain carried in said chamber;
   a needle valve for regulating the size of the orifice, said needle valve being normally closed and slidably mounted in a bore and adapted to be moved in said bore to a preselected position to provide an exhaust port for the generator;
   a soft metal limiting plate and temperature sensitive means for moving said plate to a position to be engaged by said needle valve; and
   means carried by the needle valve and actuated by ignition of the solid fuel for preventing further variation of the size of the orifice.

2. In a solid fuel servo system, a gas generator according to claim 1 wherein the means carried by the regulating needle valve and actuated by the ignition of the solid fuel comprises a spike integral with the needle valve and adapted to engage the soft metal of the limiting plate to prevent further variation of the size of the orifice.

3. In a gas generator using solid fuel, the combination of
   an exhaust port formed in said generator, said port having a valve seat;
   a needle valve normally seated on said seat, said needle valve being adapted to be moved longitudinally to open said exhaust port; and
   a soft metal limiting plate and temperature sensitive means for moving said plate to a position to be engaged by said needle valve, said metal plate receiving and retaining a portion of said needle valve to prevent further movement of said needle valve with relation to said valve seat; with
   means generated within the gas generator for initiating movement of the needle valve to the extent of engagement with the soft metal limiting plate.

References Cited

UNITED STATES PATENTS

| | | | |
|---|---|---|---|
| 2,489,953 | 11/1949 | Burney | 102—49 |
| 2,612,747 | 10/1952 | Skinner | 102—49 |
| 2,870,599 | 1/1959 | Long | 60—35.6 |

CARLTON R. CROYLE, *Primary Examiner.*

SAMUEL FEINBERG, *Examiner.*